US007548251B2

(12) United States Patent
Terumoto

(10) Patent No.: US 7,548,251 B2
(45) Date of Patent: Jun. 16, 2009

(54) IMAGE FORMING DEVICE AND IMAGE FORMING DISPLAY PANEL

(75) Inventor: Koji Terumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/176,693

(22) Filed: Jul. 7, 2005

(65) Prior Publication Data

US 2006/0033807 A1 Feb. 16, 2006

(30) Foreign Application Priority Data

Jul. 7, 2004 (JP) ............................ 2004-200379

(51) Int. Cl.
*B41J 2/45* (2006.01)
*H04N 5/225* (2006.01)

(52) U.S. Cl. .................................... 347/238; 348/207.2

(58) Field of Classification Search ................. 347/256, 347/241, 224, 238, 237, 242, 247, 257; 348/207.2, 348/209.99, 210.99, 262–266
See application file for complete search history.

(56) References Cited

U.S. PATENT DOCUMENTS 5,109,374 A * 4/1992 Tsunoda et al. ............. 369/100
5,745,156 A * 4/1998 Federico et al. ............. 347/256
5,949,469 A * 9/1999 Stephenson ................. 347/255
6,111,560 A * 8/2000 May ........................... 345/102
6,480,259 B1 * 11/2002 Wong et al. ................... 355/52
6,606,110 B2 * 8/2003 Gaudiana et al. ............ 347/238
6,788,327 B2 * 9/2004 Chino ......................... 347/224
6,825,865 B2 * 11/2004 Fujimoto et al. ............ 347/232
7,042,483 B2 * 5/2006 Wong et al. ................. 347/238
7,042,644 B2 * 5/2006 Nishikawa .................. 359/619
7,081,912 B2 * 7/2006 Seki et al. .................... 347/244

FOREIGN PATENT DOCUMENTS

JP 7-304212 11/1995

* cited by examiner

*Primary Examiner*—Hai C Pham
(74) *Attorney, Agent, or Firm*—Hamre, Shumann, Mueller & Larson, P.C.

(57) ABSTRACT

An image forming device includes a display panel for exposing a photosensitive recording medium to light. The display panel includes a light transmissive substrate, and a plurality of light emitting elements provided on the substrate. The substrate includes a first surface for facing the photosensitive recording medium, a second surface which is opposite from the first surface, and thickness T defined as spacing distance between the first surface and the second surface. The plurality of light emitting elements is provided on the second surface to be spaced from each other. When refractive index of the substrate is expressed by n and minimum spacing distance between the plurality of light emitting elements is expressed by S, the thickness T satisfies the following inequality:

$$T \leq \frac{S\sqrt{n^2-1}}{2}.$$

5 Claims, 9 Drawing Sheets

IMAGE FORMING DEVICE AND IMAGE FORMING DISPLAY PANEL

BACKGROUND OF THE INVENTION

1. Field of the Invention

The present invention relates to an image forming device for forming an image on a photosensitive recording medium. The present invention particularly relates to an image forming device including a display panel for exposing a photosensitive recording medium to light.

2. Description of the Related Art

JP-A H07-304212 discloses an example of prior art image forming device. The prior art image forming device (digital printer) is designed to form an image on a photosensitive recording medium. Specifically, the printer includes an exposure unit, and an imaging unit arranged between the exposure unit and a photosensitive recording medium. The exposure unit comprises a transmissive liquid crystal panel and a backlight. The imaging unit comprises a lens, mirror and an aperture, for example.

In the prior art printer, image forming is performed as follows. Firstly, a pattern corresponding to an image to be formed is formed on the liquid crystal panel, and the pattern is illuminated by the backlight. The liquid crystal panel blocks part of the illuminating light but transmits the remaining part of the light. The transmitted light is converged on the photosensitive recording medium via the imaging unit, whereby an electrostatic latent image is formed on the recording medium. Finally, the electrostatic latent image is subjected to a developing process, whereby the intended image is provided as a visible image.

As noted above, in the prior art printer, the imaging unit is arranged between the exposure unit and the photosensitive recording medium. The existence of the imaging unit constitutes an obstacle to the reduction of thickness and weight of the entire printer.

Further, the prior art printer has a drawback that the light emitted from the exposure unit is weakened by passing through the imaging unit. Clearly, such attenuation of light (reduction in amount of light) is not favorable for forming a high quality image. Therefore, in the prior art printer, the amount of light to be emitted from the backlight is set to a relatively high level to compensate for the loss of light. However, such a measure causes another problem of an increase in power consumption of the printer.

SUMMARY OF THE INVENTION

An object of the present invention, which is conceived under such circumstances, is to solve the above problems of a prior art structure. Specifically, the present invention aims to provide an image forming device which is capable of forming a proper image on a recording medium without using an imaging unit which has been provided in a prior art device.

According to the present invention, there is provided an image forming device including a display panel for exposing a photosensitive recording medium to light. The display panel comprises a light transmissive substrate including a first surface for facing the photosensitive recording medium, a second surface which is opposite from the first surface and thickness T defined as spacing distance between the first surface and the second surface, and a plurality of light emitting elements provided on the second surface to be spaced from each other. When the refractive index of the substrate is expressed by n and the minimum spacing distance between the plurality of light emitting elements is expressed by S, the thickness T satisfies the following inequality:

$$T \leq \frac{S\sqrt{n^2 - 1}}{2}.$$

The minimum spacing distance S means the smallest one of distances between adjacent light emitting elements. For instance, when all the spacing distances between adjacent light emitting elements are equal to each other, the fixed distance is the minimum spacing distance S. On the other hand, when the spacing distances between adjacent light emitting elements are different, the smallest one of the spacing distances is the minimum spacing distance S.

According to the present invention, the thickness T of the substrate is so set as to satisfy the above-described inequality. With such a structure, in illuminating the photosensitive recording medium, the light rays deriving from adjacent light emitting elements are prevented from interfering with each other. Specifically, consideration is given to two light spots formed at the first surface of the substrate by two narrow-angle rays deriving from two adjacent light emitting elements. When the distance between the two light emitting elements is equal to the minimum spacing distance S, the two light spots meet on the first surface of the substrate. On the other hand, when the distance between the two light emitting elements is larger than the minimum spacing distance S, the two light spots are spaced from each other on the first surface of the substrate. In both cases, the two narrow-angle rays reach the first surface of the substrate without interfering with each other and then pass through the first surface to immediately irradiate the photosensitive recording medium. In this way, interference of rays deriving from adjacent light emitting elements is prevented in the exposure process. Therefore, a high-quality image free from unevenness can be formed on the photosensitive film.

According to the present invention, a proper image can be formed on a photosensitive recording medium without using an imaging unit (including e.g. an imaging lens). Therefore, the image forming device of the present invention can be made thin and light. Further, with the structure which does not utilize an imaging unit unlike the prior art structure, reduction in amount of light does not occur. Therefore, the image forming device of the present invention is also advantageous for reducing the power consumption.

Preferably, the image forming device of the present invention further comprises a reinforcing member for increasing the mechanical strength of the substrate. Such a structure is advantageous for preventing the substrate from warping, bending and breaking, for example.

Preferably, each of the light emitting elements comprises an organic EL element. Organic EL elements are self-luminous elements and do not require a backlight. This point is advantageous for reducing the weight and thickness of the image forming device and also advantageous for reducing the power consumption of the device.

Preferably, the display panel is capable of displaying a pattern corresponding to entirety of an image to be formed on the photosensitive recording medium. Such a structure contributes to the reduction of time required for forming an intended image on the photosensitive recording medium.

Preferably, the image forming device further comprises a mover for moving the display panel relative to the photosensitive recording medium. In this case, the display panel is capable of individually displaying a plurality of patterns corresponding to a plurality of partial images constituting an image to be formed on the photosensitive recording medium. Such a structure is suitable for forming an image which is larger than the size of an image which can be displayed on the display panel.

Other features and advantages of the present invention will become clearer from the description of the preferred embodiment given below.

DETAILED DESCRIPTION OF THE PREFERRED EMBODIMENTS

Preferred embodiments of the present invention will be described below in detail with reference to the accompanying drawings.

Figure 1:
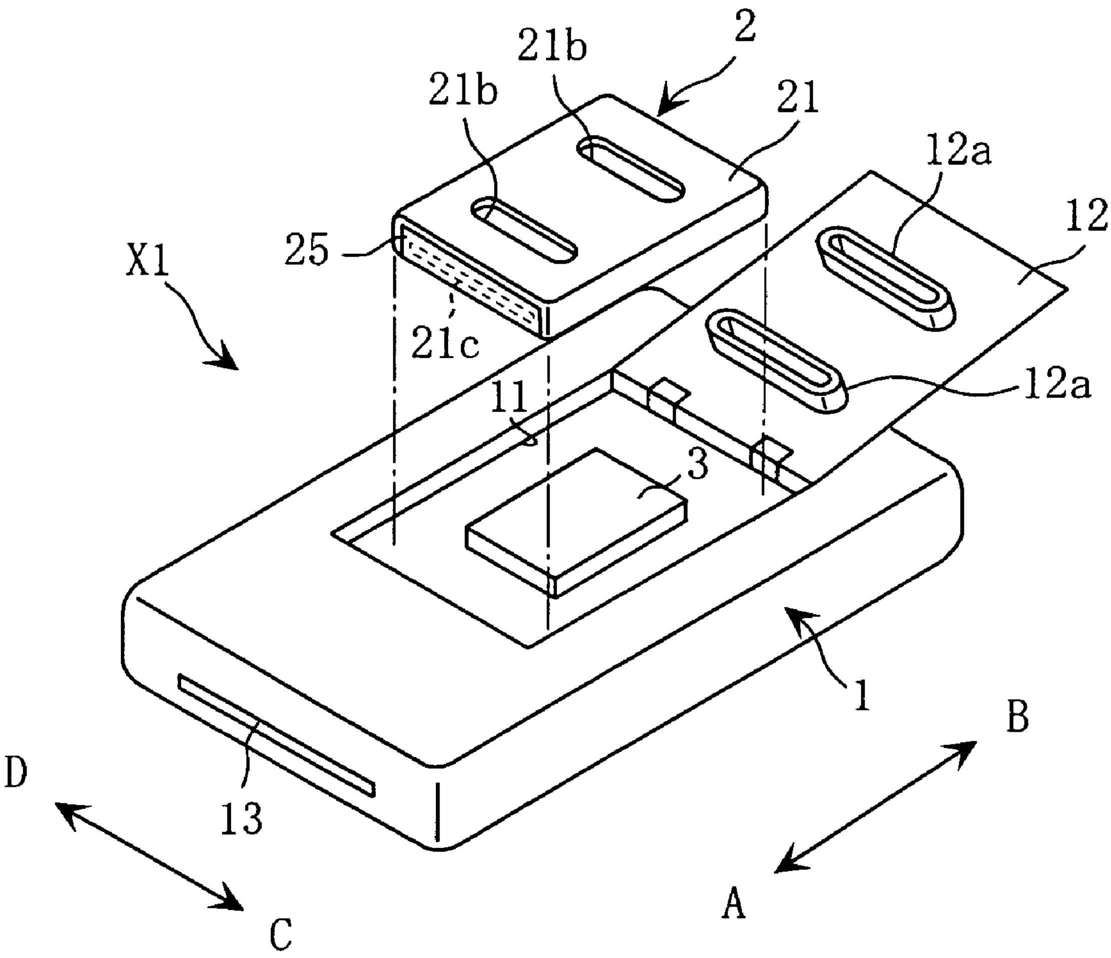
FIG. 1 is a perspective view showing an image forming device according to a first embodiment of the present invention.
Figure 2:
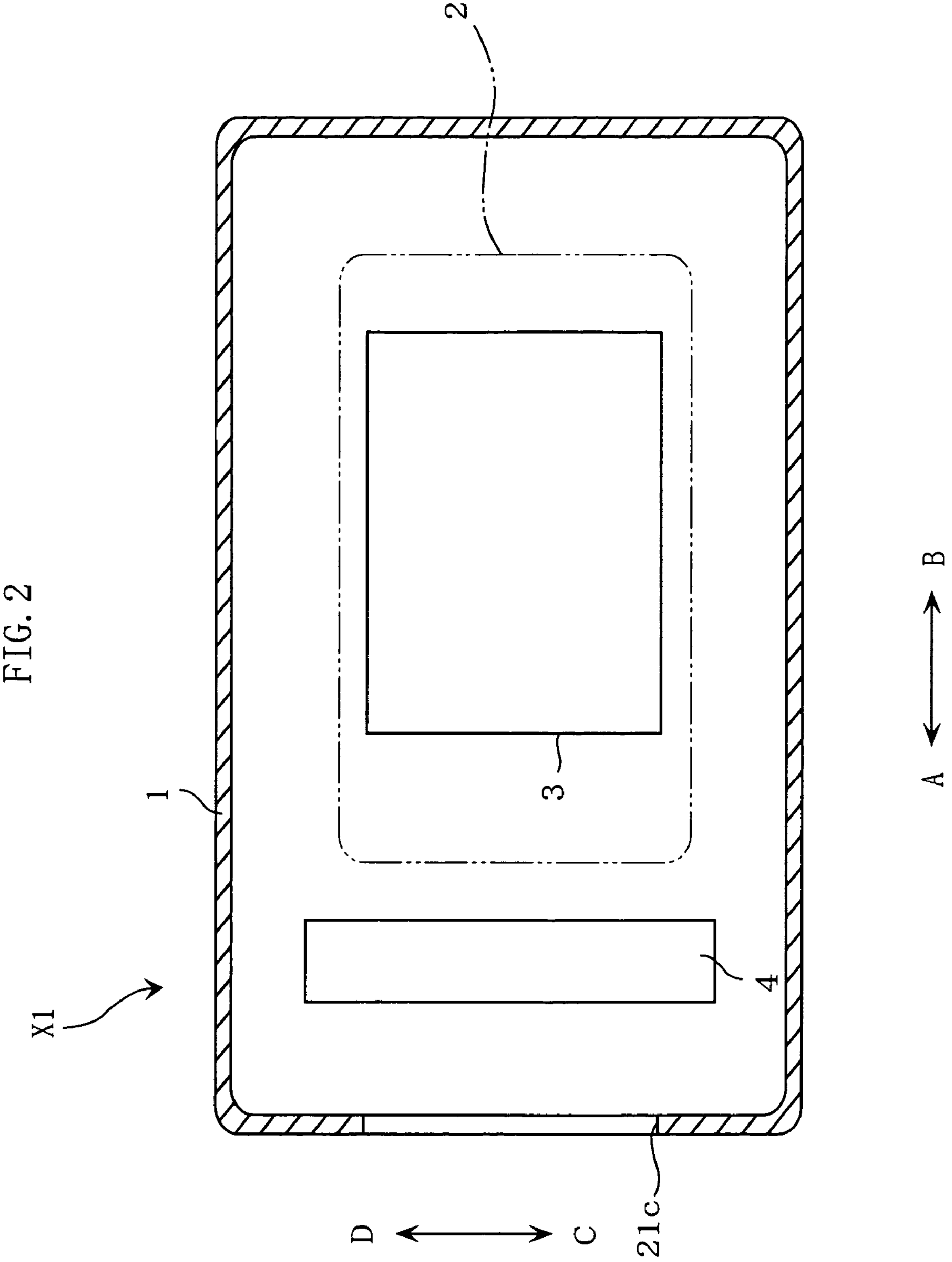
FIG. 2 is a plan view schematically showing the internal structure of the image forming device of FIG. 1.
Figure 3:
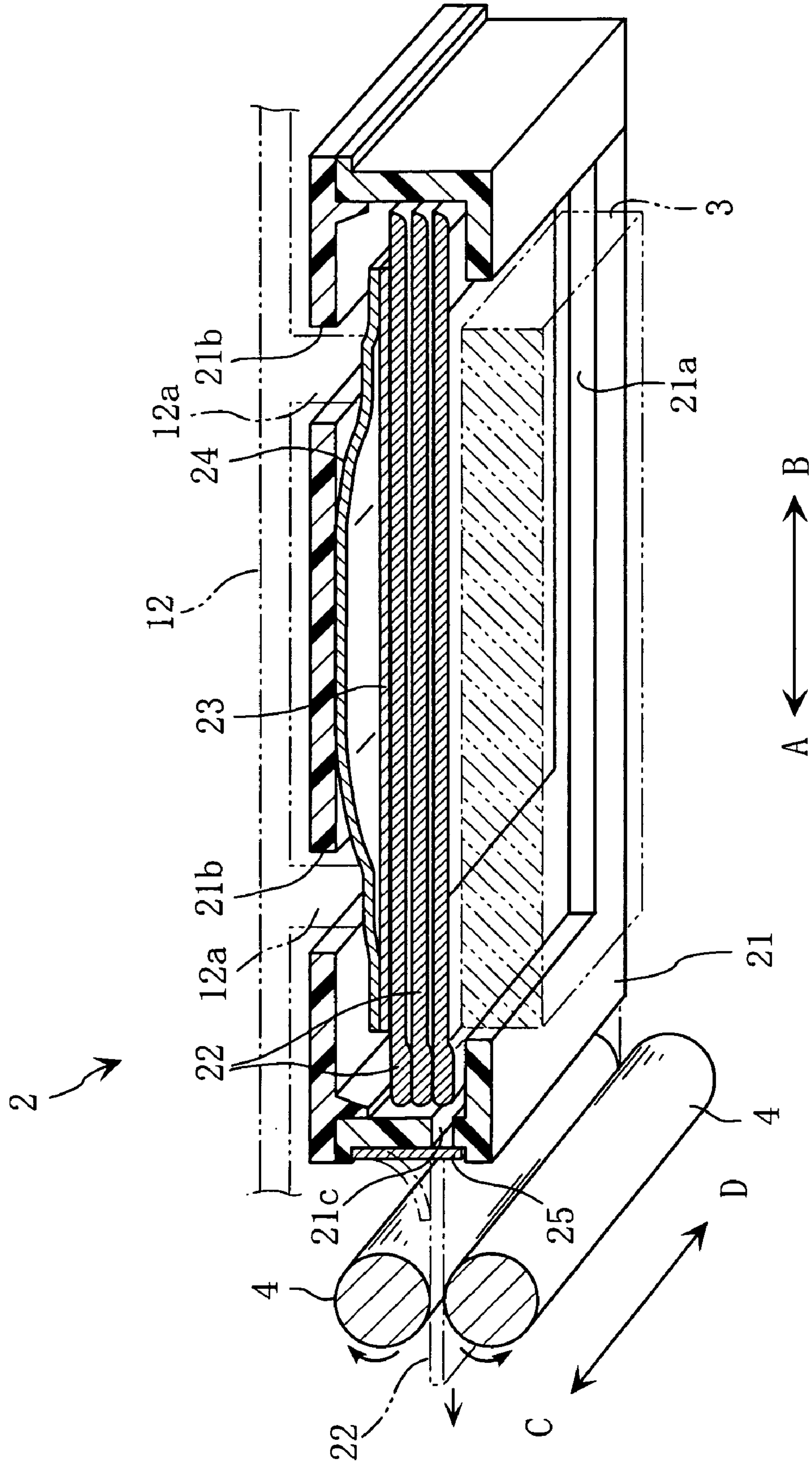
FIG. 3 is a sectional view showing the internal structure of the image forming device of FIG. 1.

FIGS. 1-3 show an image forming device X1 according to a first embodiment of the present invention. As shown in FIG. 1, the image forming device X1 includes a housing 1, a film pack 2 and an organic EL panel 3. As shown in FIG. 3, a pair of platen rollers 4 is provided adjacent to an end surface of the film pack 2.

As shown in FIG. 1, the housing 1 is a hollow member in the form of a generally rectangular parallelepiped. The upper wall of the housing 1 (in FIG. 1) is formed with a rectangular opening 11. The opening 11 can be closed by a lid 12 pivotally attached to the housing 1. The housing 1 has an end wall formed with a slit 13 elongated in the DC direction.

The film pack 2 can be put into and taken out of the housing 1 through the opening 11. As shown in FIG. 1, the inner surface of the lid 12 is formed with two projections 12*a*. When the lid 12 closes the opening 11, each of the projections 12*a* projects into the housing 1. The slit 13 is utilized for taking out, from the housing 1, a photosensitive film 22 (See FIG. 3) after the image forming process (which will be described later) in the image forming device X1.

As shown in FIG. 3, the film pack 2 contains a plurality of photosensitive films 22. Specifically, the film pack 2 includes a case 21, and the case accommodates a plurality of photosensitive films 22, a support plate 23 and a leaf spring 24. The support plate 23 is arranged between the photosensitive films 22 and the leaf spring 24. The leaf spring 24 biases the support plate 23, and hence the photosensitive films 22 downward in the figure. Although the film pack 2 contains three photosensitive films 22 in the illustrated example, the present invention is not limited thereto.

The case 21 includes a first opening 21*a*, two second openings 21*b* and a third opening 21*c*. The first opening 21*a* exposes a light exposure surface of the photosensitive film 22 to the outside of the case 21. The second openings 21*b* are formed at locations respectively corresponding to the projections 12*a* of the lid 12. When the lid 12 closes the opening 11 of the housing 1, each of the projections 12*a* projects into the case 21 through a corresponding one of the openings 21*b*, and applies, to the support plate 23, a pressing force toward the opening 21*a*. The third opening 21*c* is formed at an end wall of the case 21 and utilized for transmitting the photosensitive film 22 to the outside of the case 21. The third opening 21*c* is covered by a curtain 25 for preventing e.g. dust from entering the case 21.

Figure 4:
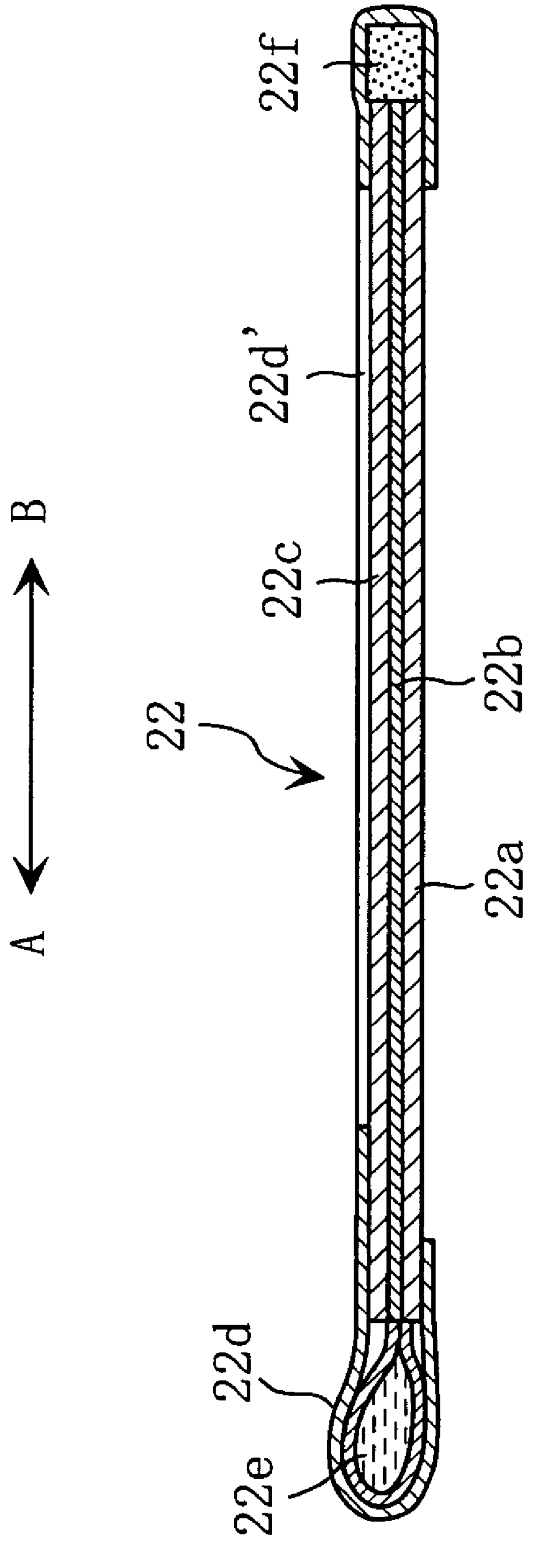
FIG. 4 is a sectional view of the structure of a photosensitive film shown in FIG. 3.

As shown in FIG. 4, each of the photosensitive films 22 includes a transparent base material 22*a*, a photosensitive layer 22*b*, a transparent cover 22*c*, an adhesive sheet 22*d*, a developer retaining pack 22*e* and a trap material 22*f*. The transparent base material 22*a*, the photosensitive layer 22*b* and the transparent cover 22*c* are stacked together in the vertical direction in FIG. 4. The adhesive sheet 22*d* includes a relatively wide center portion (the portion lying on the transparent cover 22*c*), a first end (left end in FIG. 4) and a second end (right end). The center portion is formed with an opening 22*d*'. Each of the first and the second ends is folded back and bonded to the base material 22*a*. The developer retaining pack 22*e* is provided at one end of the photosensitive film 22 and wrapped with the first end of the adhesive sheet 22*d*. The trap material 22*f* is provided at the other end of the photosensitive film 22 and wrapped with the second end of the adhesive sheet 22*d*. The trap material 22*f* serves to trap the developer passed through the photosensitive layer 22*b* in the developing process, which will be described later. In the photosensitive film 22, light is directed to the photosensitive layer 22*b* from the side of the transparent base material 22*a*. The image formed at the photosensitive layer 22*b* is viewed from the side of the transparent cover 22*c*.

Figure 5:
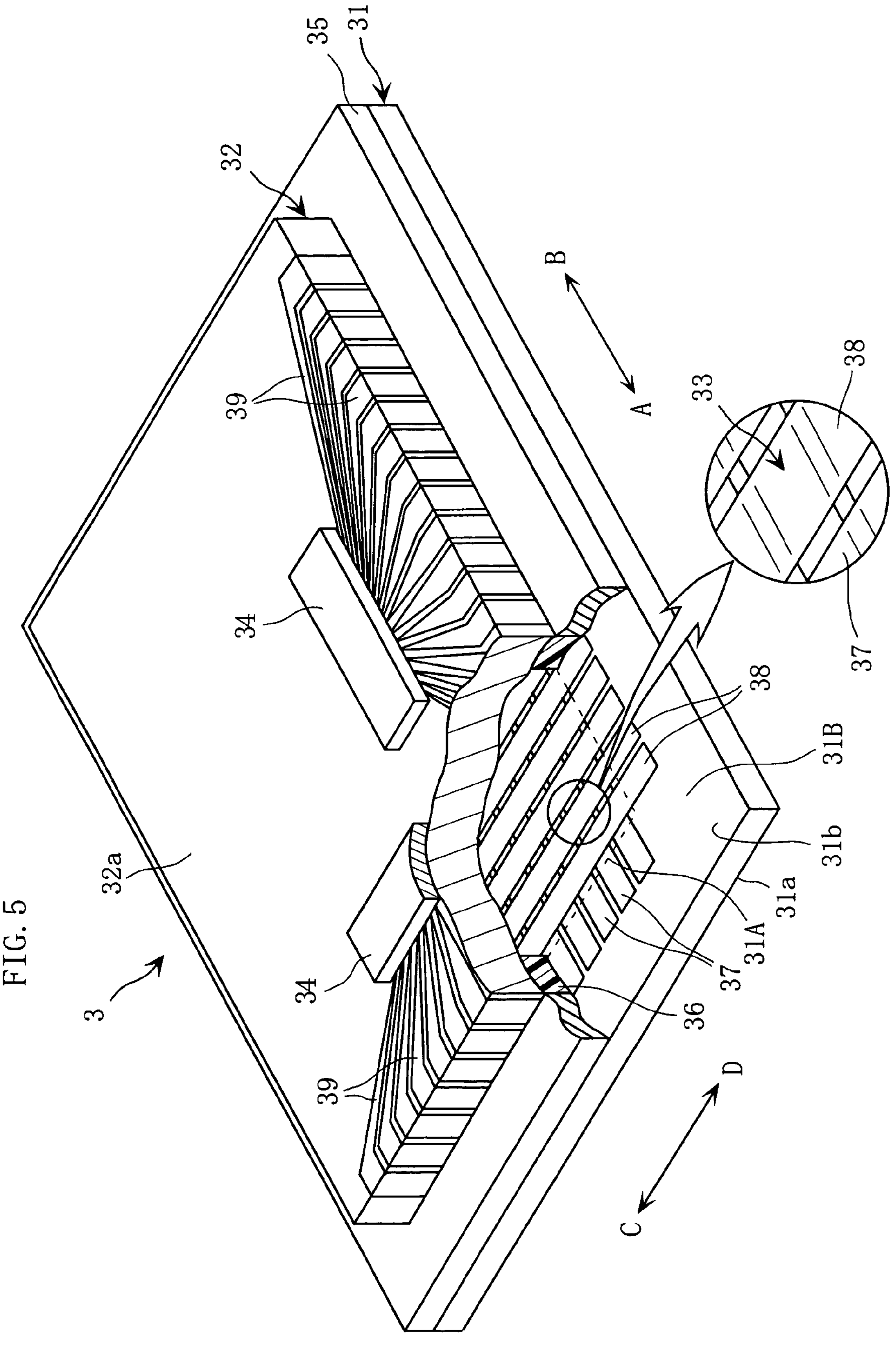
FIG. 5 is a perspective view schematically showing the organic EL panel shown in FIG. 1.

FIG. 5 schematically shows the entirety of the organic EL panel 3. As will be understood from the figure, the organic EL panel 3 includes a transparent substrate 31, a cover 32, a plurality of display elements (light emitting elements) 33 and a driver IC 34. For instance, in the organic EL panel 3, each of the display elements 33 is driven by passive driving by a line sequential method.

The substrate 31 may be made of transparent glass or transparent resin, for example. The substrate 31 includes a first surface 31*a* and a second surface 31 *b* and is made up of a display element region 31A and a peripheral region 31B surrounding the display element region. In FIG. 5, the boundary between the two regions 31A and 31B is indicated by broken lines. The display element region 31A corresponds to the effective display region (display screen) of the organic EL panel 3. In the image forming device X1, the first surface 31*a* faces the above-described film pack 2 and the photosensitive film 22. In the image forming device X1, the substrate 31 and the film pack 2, or the photosensitive film 22 are so arranged that the first surface 31*a* of the substrate 31 comes into close contact with the base material 22*a* of the photosensitive film 22 (contact type) or the clearance between the first surface 31*a* and the base material 22*a* is sufficiently small (proximity type). The thickness of the substrate 31 may be 2 to 5 μm, for example. In this embodiment, to increase the mechanical strength of the substrate 31, a reinforcing member 35 in the form of a frame is attached to the peripheral region 31B of the substrate 31. With such a structure, the substrate 31 is prevented from warping, bending or breaking, for example. The substrate 31 may be prepared by forming a plurality of display elements 33 on the second surface 31*b* of a substrate in a state having a sufficient thickness (e.g. 0.7 mm) and then mechanically polishing the first surface 31*a* side.

The cover 32 is bonded to the peripheral region 31B on the side of the second surface 31*b* of the substrate 31 via a predetermined sealing member 36. With such a structure, hermetic sealing is provided between the cover 32 and the substrate 31. The cover 32 may be made of an insulating material such as glass, a ceramic material or resin, for example.

The plurality of display elements 33 are arranged in a matrix on the second surface 31*b* of the substrate 31. Specifically, in a laminated structure made up of a plurality of anodes 37 formed in a pattern on the second surface 31*b*, a plurality of organic EL films (not shown) formed in a pattern to lie thereon, and a plurality of cathodes 38 formed in a pattern to lie thereon, the portions where the anodes 37 and the cathode 38 overlap each other provide the display elements 33. The arrangement pitch of the display elements 33 in the AB direction is constant, and the arrangement pitch of the display elements in the CD direction is also constant.

Each of the anodes 37 is a transparent electrode provided by forming e.g. an ITO (Indium Tin Oxide) film on the second surface 31*b* by vapor deposition and then subjecting the film to etching, for example. The anode extends in the direction of arrow AB in FIG. 5. Each of the organic EL films is formed on the anode 37 and made up of e.g. a hole injection layer, a hole transport layer, a light emitting layer, an electron transport layer and an electron injection layer which are successively laminated on the anode 37. The light emitting layer includes a fluorescent organic substance. By selecting the fluorescent organic substance to provide the light emitting layer, the color of the light to be emitted from each organic EL film can be set to red, green or blue, for example. Each of the cathodes 38 is an electrode provided by forming an aluminum film by vapor deposition from above the organic EL film and then subjecting the film to etching, for example. The cathode extends in the direction of arrow CD in FIG. 5. In each of the display elements 33, the fluorescent organic substance in the light emitting layer of the organic EL film emits light when a predetermined voltage is applied between the anode 37 and the cathode 38.

The driver IC 34 controls the voltage to be applied between a pair of anode 37 and cathode 38 based on electric power or various kinds of signals supplied from the outside of the organic EL panel 3 through a flexible able (not shown). As shown in FIG. 5, the driver IC 34 is mounted on the upper surface 32*a* of the cover 32 and connected to the anodes 37 and the cathodes 38 via different wirings 39.

In the organic EL panel 3, by the operation of the driver IC 34, the light emission of all the display elements 33 on the second surface 31*b* of the substrate 31 is controlled to display a desired image. The light emitted from each of the display elements 33 and entered the substrate 31 passes through the substrate 31 for emission through the first surface 31*a*. The organic EL panel 3 is fixed to a position where the first surface 31*a* of the substrate 31 faces the film pack 2, or the photosensitive film 22 by non-illustrated fixing means.

The paired platen rollers 4 serve to pull out and transfer the photosensitive film 22 sent out of the film pack 2 in the image forming process by the image forming device X1 and transfer the photosensitive film to the outside of the housing 1 through the slit 13 of the housing 1. Further, the platen rollers 4 apply a pressing force to the developer retaining pack 22*e* when the photosensitive film 22 passes between the platen rollers 4 to push the developer out of the developer retaining pack 22*e* and spread the developer over the entire surface of the photosensitive layer 22*b*.

In the organic EL panel 3 having the above-described structure, when the thickness of the substrate 31 (defined by the first surface 31*a* and the second surface 31*b*) is expressed by T, the refractive index of the substrate 31 is expressed by n (>1) and the minimum spacing distance between adjacent ones of the display elements 33 is expressed by S, the thickness T of the substrate 31 is so set as to satisfy the following formula (1):

$$T \leq \frac{S\sqrt{n^2-1}}{2} \tag{1}$$

Herein, the minimum spacing distance S is the smallest one of distances between adjacent display elements 33 in the organic EL panel 3. For instance, it is assumed that the display elements 33 are equally spaced in the row direction and also equally spaced in the column direction. In this case, when the distance between display elements in the row direction is equal to the distance between display elements in the column direction, the common distance is the minimum spacing distance S. On the other hand, when the distance between display elements in the row direction is different from the distance between display elements in the column direction, the smaller one of the distances is the minimum spacing distance S.

Figure 6:
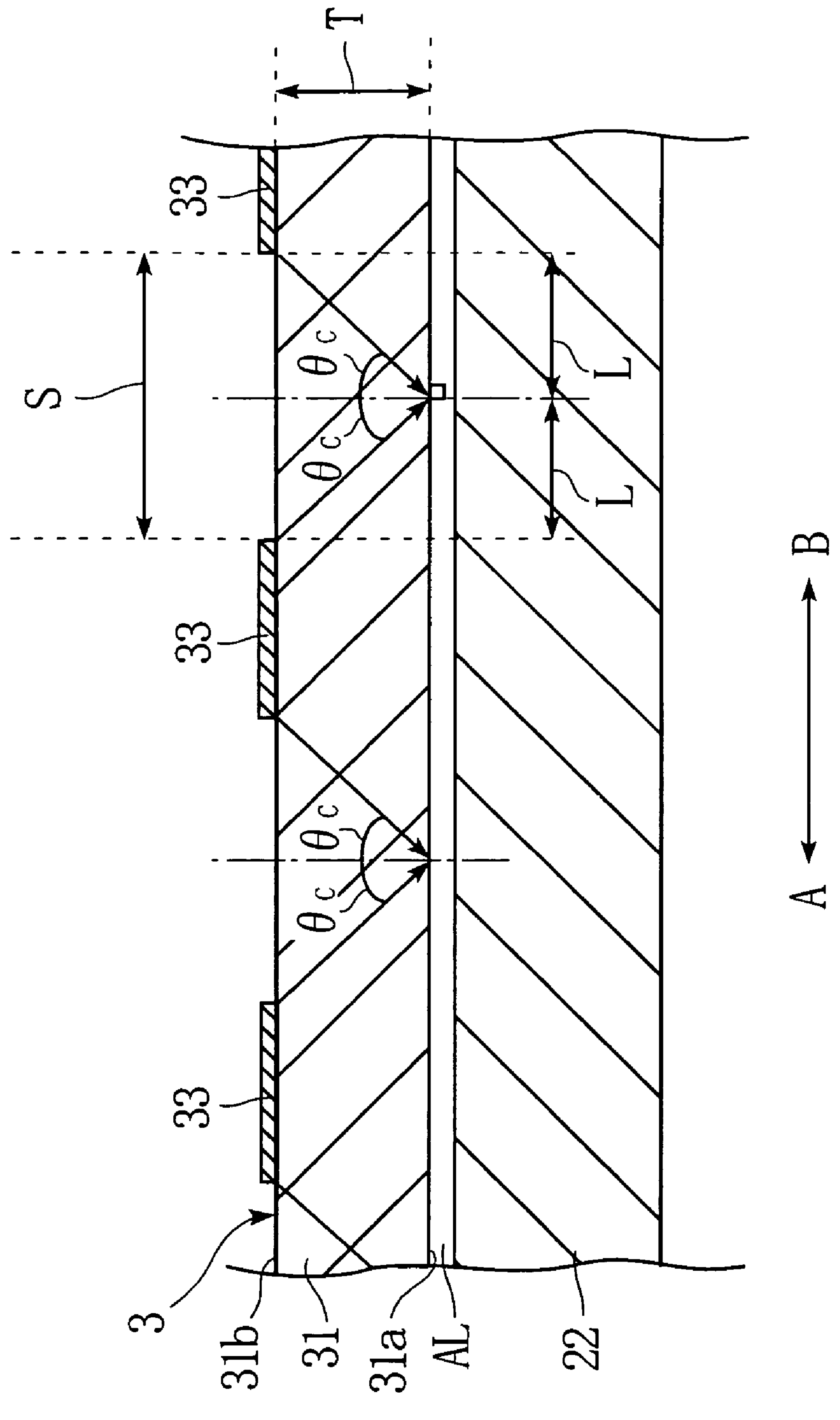
FIG. 6 is a sectional view for describing how the inequality relating to the thickness of the substrate of the organic EL panel shown in FIG. 5 is derived.

The light rays emitted from the display elements 33 enter the substrate 31. The above formula (1) represents the condition that the ray whose incident angle on the first surface 31*a* is smaller than the critical angle of total reflection (narrow-angle ray) does not intersect a narrow-angle ray deriving from the adjacent display element 33 within the substrate 31. How the formula (1) is derived will be described below with reference to FIG. 6. It is to be noted that FIG. 6 shows an example in which a thin air layer AL intervenes between the first surface 31*a* of the substrate 31 and the photosensitive film 22. The structure in which the air layer AL is negligibly small corresponds to the above-described contact type. The structure in which the air layer AL is not negligibly small corresponds to the above-described proximity type.

The refractive index of the substrate 31 is to be expressed by $n_1$, whereas the refractive index of the air layer AL is to be expressed by $n_2$. Part of the light rays emitted from the display elements 33 enters the air layer AL after passing through the substrate 31. In this case, the angle of incidence on the first surface 31*a* of the ray entering the air layer AL from the substrate 31 is to be expressed by $\theta_1$. The angle of refraction (angle of emission) at the first surface 31*a* of the ray emitted from within the substrate 31 to the air layer AL is to be expressed by $\theta_2$. In this case, the following formula (2) holds:

$$n_1 \sin\theta_1 = n_2 \sin\theta_2 \tag{2}$$

In the formula (2), when the angle of incidence $\theta_1$ is the critical angle of total reflection $\theta_c$, the angle of refraction $\theta_2$ is 90°. The refractive index $n_2$ of the air layer AL is substantially 1 (absolute refractive index of air). From these, the following formula (3) and further the formula (4) are obtained.

$$n_1 \sin\theta_c = 1 \tag{3}$$

$$\sin\theta_c = \frac{1}{n_1} \tag{4}$$

The distance L which the ray whose angle of incidence on the first surface 31*a* is $\theta_c$ (critical angle of total reflection) travels in the direction of arrow AB in passing through the substrate 31 is given by the following formula (5) and further the formula (5)' as a transformation of the formula (5).

$$L = T\tan\theta_c \tag{5}$$

$$= T \cdot \frac{\sin\theta_c}{\sqrt{1-\sin^2\theta_c}} \tag{5'}$$

By substituting the formula (4) for the formula (5'), the following formula (6) is obtained.

$$L = \frac{T}{\sqrt{n_1^2 - 1}} \tag{6}$$

As expressed by the formula (7) below, when the distance L is smaller than half the minimum spacing distance S between adjacent display elements, the narrow-angle ray (the light whose angle of incidence on the first surface 31*a* is smaller than the critical angle of total reflection $\theta_c$) does not intersect a narrow-angle ray deriving from the adjacent display element 33 within the substrate 31.

$$L \le \frac{1}{2}S \tag{7}$$

From the above formulae (6) and (7), the formula (1) is obtained. That is, when the formula (1) holds, the narrow-angle ray deriving from one display element 33 does not intersect a narrow-angle ray deriving from the adjacent display element 33 within the substrate 31.

The operation of the image forming device X1 until an image is formed on the photosensitive film 22 will be described below.

Firstly, the film pack 2 is set in the image forming device X1 to arrange the photosensitive film 22 in facing relationship to the organic EL panel 3 (See FIG. 3). Subsequently, by causing the organic EL panel 3 to display a predetermined image, the photosensitive layer 22*b* of the photosensitive film 22 is collectively exposed to light (exposure process). In this exposure process, the light rays emitted from respective display elements 33 of the organic EL panel 3 enter the substrate 31 through the second surface 31*b*. Thereafter, the light rays pass through the substrate 31 to reach the first surface 31*a* of the substrate 31. Of the rays which have reached the first surface 31*a*, the ray whose angle of incidence on the first surface 31*a* exceeds the critical angle of total reflection (wide-angle ray) is reflected by the first surface 31*a* toward the inside of the substrate. On the other hand, the ray whose angle of incidence on the first surface 31*a* is smaller than the critical angle of total reflection (narrow-angle ray) passes through the first surface 31*a* for emission to the outside of the substrate. The photosensitive layer 22*b* of the photosensitive film 22 is exposed to the emitted ray.

As indicated by double-dashed lines in FIG. 3, after the exposure process, the photosensitive film 22 is pushed out of the film pack 2 by a predetermined push mechanism (not shown) The photosensitive film 22 which has pushed out is pulled out of the film pack 2 by the operation of the paired platen rollers 4 and then transferred to the outside of the housing 1 through the slit 13. When the photosensitive film 22 passes between the paired platen rollers 4, the platen rollers 4 apply a pressing force to the developer retaining pack 22*e* (shown in FIG. 4) of the photosensitive film 22. As a result, the developer is pushed out of the developer retaining pack 22*e* to spread over the entire surface of the photosensitive layer 22*b* (developing process). By the developing process, the intended image develops as a visible image on the photosensitive layer 22*b* of the photosensitive film 22.

In the image forming device X1, the thickness T of the substrate 31 is so set as to satisfy the above formula (1). Therefore, in the above-described exposure process, the light rays respectively deriving from adjacent display elements 33 are prevented from undesirably interfering with each other in illuminating the photosensitive film 22, or the photosensitive layer 22*b*. Therefore, a high-quality image free from unevenness is formed on the photosensitive film 22.

In the image forming device X1, the photosensitive film 22 can be directly irradiated with light emitted from the organic EL panel 3 (display elements 33) without using a conventionally used imaging unit. Such a structure is advantageous for reducing the weight and thickness of the entire device. Further, unlike the prior art structure, the image forming device X1 can prevent the light emitted from each display element 33 from being attenuated by passing through a lens (imaging unit). Therefore, the amount of light emission from the organic EL panel 3 can be set smaller than in the prior art structure, which is advantageous for reducing the power consumption.

Moreover, the image forming device X1 is provided with the organic EL panel 3 as the exposure means. The organic EL panel 3 is a self-luminous display panel and does not require a backlight. This point is also advantageous for reducing the weight and thickness of the entire device as well as for reducing the power consumption.

Figure 7:
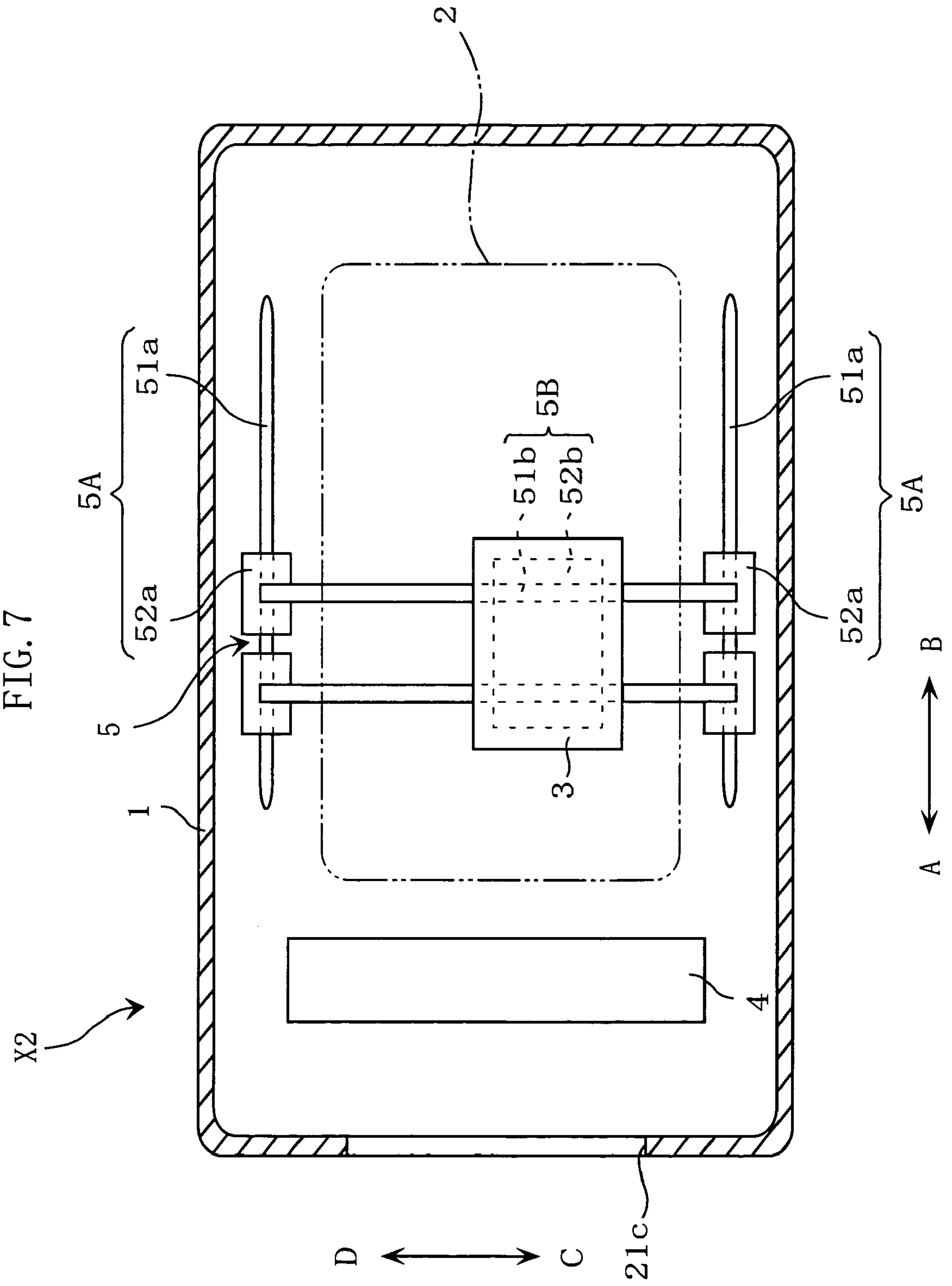
FIG. 7 is a plan view schematically showing the internal structure of an image forming device according to a second embodiment of the present invention.

FIG. 7 is a plan view schematically showing the internal structure of an image forming device X2 according to a second embodiment of the present invention. In the second embodiment, the elements or portions which are identical or similar to those of the first embodiment are designated by the same reference signs as those used for the first embodiment.

As shown in FIG. 7, the image forming device X2 includes a housing 1, a film pack 2, an organic EL panel 3, a pair of platen rollers 4 and an actuator 5. Similarly to the image forming device X1, in the image forming device X2, the thickness T of the substrate 31 of the organic EL panel 3 is so set as to satisfy the above-described formula (1).

The image forming device X2 differs from the image forming device X1 in display size of the organic EL panel 3 relative to the film pack 2. Specifically, as will be understood from the comparison between FIGS. 2 and 7, the organic EL panel 3 of the second embodiment is smaller than the organic EL panel 3 of the first embodiment. Further, unlike the image forming device X1, the image forming device X2 is provided with the actuator 5 for the organic EL panel 3.

The actuator 5 moves the organic EL panel 3 relative to the photosensitive film 22. Specifically, as shown in FIG. 7, the actuator 5 includes a first transfer mechanism 5A and a second transfer mechanism 5B. Though not illustrated in the figure, the actuator 5 is further provided with a controller.

The first transfer mechanism 5A comprises a pair of guide rails 51*a* extending in the direction of arrow AB, and totally four sliders 52*a* which can be driven for translation along the guide rails 51*a*. (Two sliders correspond to one guide rail.) The transfer mechanism 5B comprises a pair of guide rails 51*b* extending in the direction of arrow CD and a support plate 52*b*. As shown in FIG. 7, each of the guide rails 51*b* has opposite ends fixed to the sliders 52*a*. The support plate 52*b* supports the organic EL panel 3 and is arranged for translation along the guide rails 51*b*. In the actuator 5, the driving of the sliders 52*a* and the support plate 52*b* for transition is controlled based on control signals from the controller.

FIGS. 8 and 9 show the operation of the image forming device X2 to form an image on the photosensitive film 22.

Figure 8A:
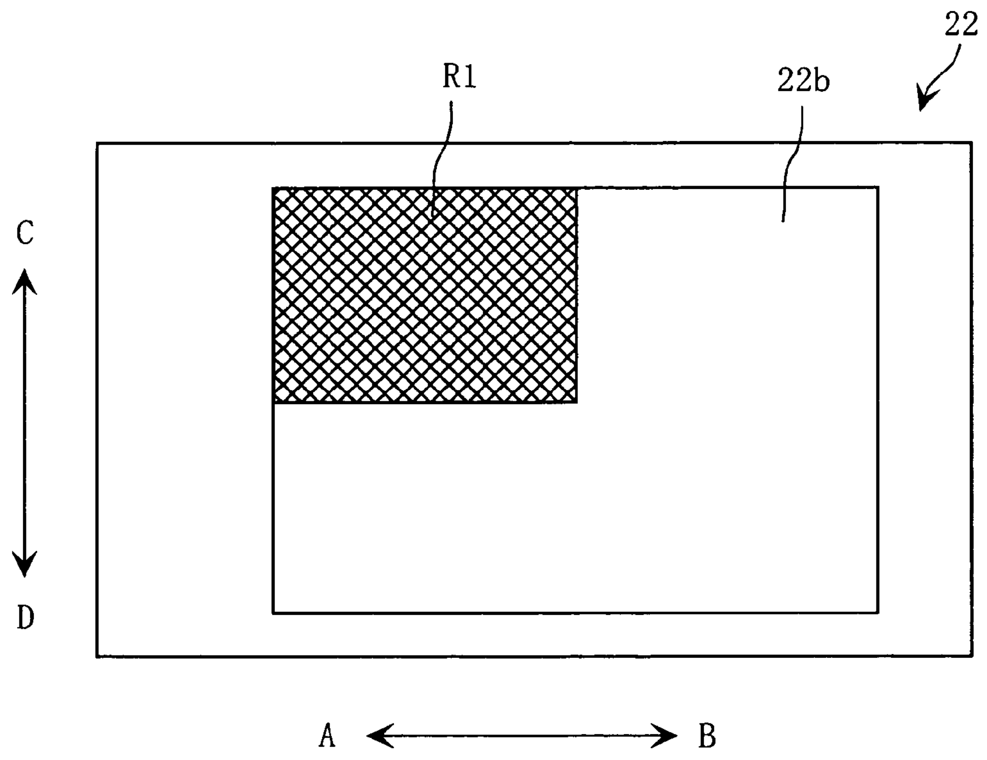
FIG. 8A is a plan view showing the state of a photosensitive film after a first exposure step is finished.

Firstly, in the image forming operation by the image forming device X2, the organic EL panel 3 is moved to a predetermined initial position by the operation of the actuator 5. Then, in a state in which the organic EL panel 3 displays a predetermined image (pattern), the photosensitive layer 22*b* of the photosensitive film 22 is exposed by the organic EL panel 3. As a result, as shown in FIG. 8A, an exposure area R1 is formed on the photosensitive layer 22*b* (first exposure step).

Subsequently, the actuator 5 translates the sliders 52*a* along the guide rails 51*a* in the direction of arrow B to move the organic EL panel 3 from the initial position (first movement step). In the illustrated example, the travel distance of the organic EL panel 3 is generally equal to the length of the display element region 31A of the organic. EL panel 3 in the direction of arrow AB.

Figure 8B:
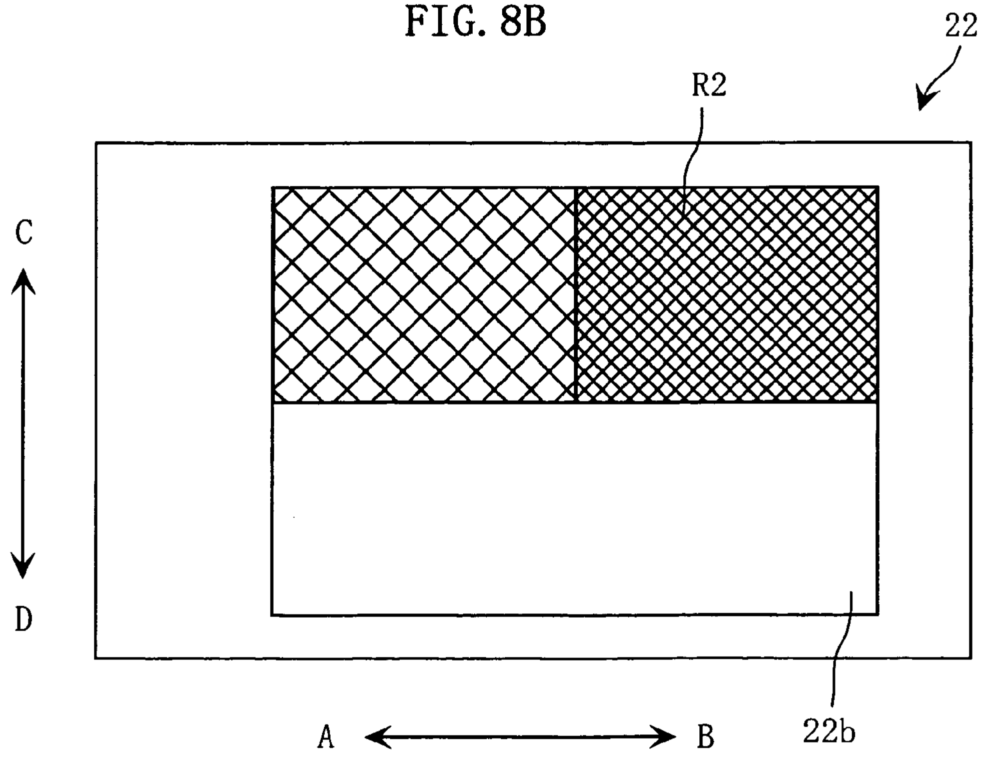
FIG. 8B is a plan view showing the state of the photosensitive film after a second exposure step is finished.

After the above-described movement, in a state in which the organic EL panel 3 displays a predetermined image, the photosensitive layer 22*b* of the photosensitive film 22 is exposed by the organic EL panel 3. As a result, as shown in FIG. 8B, another exposure area R2 is formed on the photosensitive layer 22*b* (second exposure step).

Subsequently, the actuator 5 translates the support plate 52*b* along the guide rails 51*b* in the direction of arrow D to move the organic EL panel 3 (second movement step). In the illustrated example, the travel distance of the organic EL panel 3 is generally equal to the length of the display element region 31A of the organic EL panel 3 in the direction of arrow CD.

Figure 9A:
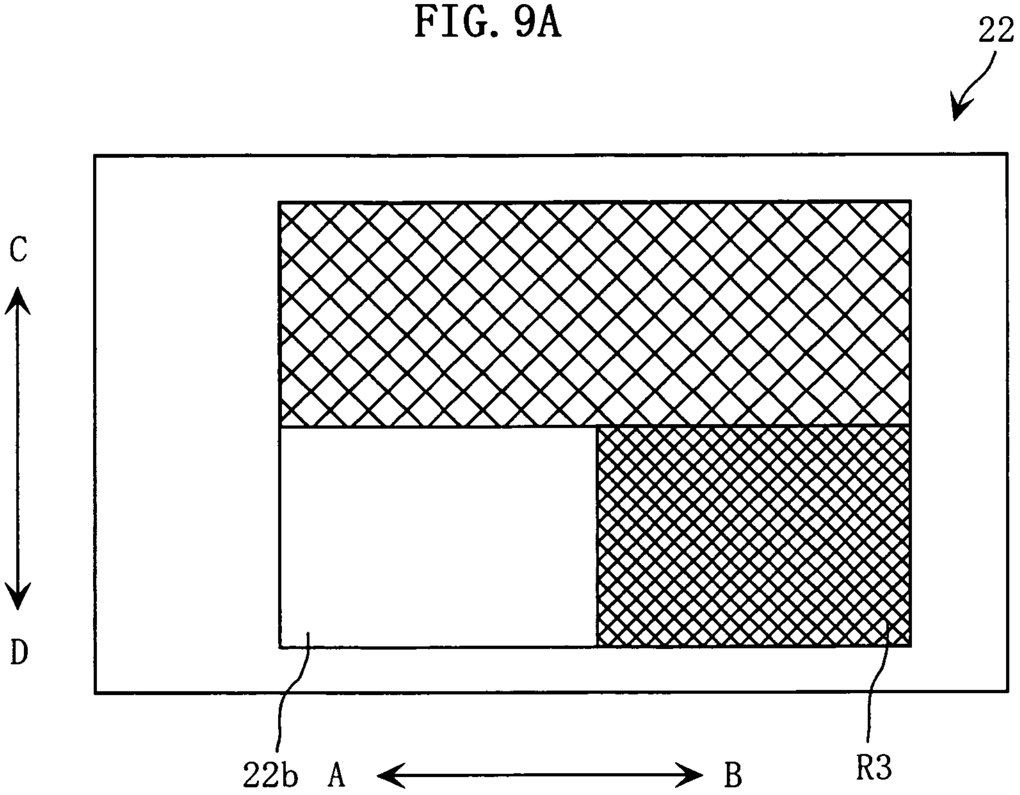
FIG. 9A is a plan view showing the state of the photosensitive film after a third exposure step is finished.

Subsequently, in a state in which the organic EL panel 3 displays a predetermined image, the photosensitive layer 22*b* of the photosensitive film 22 is exposed by the organic EL panel 3. As a result, as shown in FIG. 9A, another exposure area R3 is formed on the photosensitive layer 22*b* (third exposure step).

Subsequently, the actuator 5 translates the support plate 52*a* in the direction of arrow A along the guide rails 51*a* to move the organic EL panel 3 (third movement step). In the illustrated example, the travel distance of the organic EL panel 3 is generally equal to the length of the display element region 31A of the organic EL panel 3 in the direction of arrow AB.

Figure 9B:
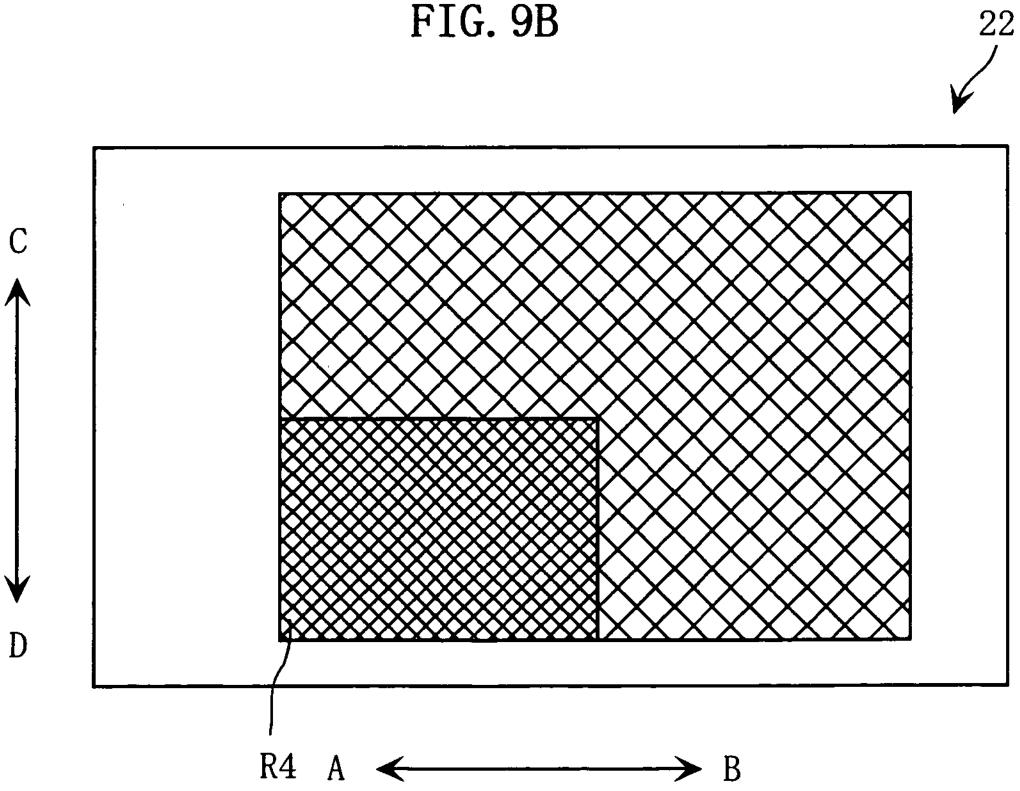
FIG. 9B is a plan view showing the state of the photosensitive film after a fourth exposure step is finished.

Subsequently, in a state in which the organic EL panel 3 displays a predetermined image, the photosensitive layer 22*b* of the photosensitive film 22 is exposed by the organic EL panel 3. As a result, as shown in FIG. 9B, another exposure area R4 is formed on the photosensitive layer 22*b* (fourth exposure step).

In this way, in the second embodiment, totally four exposure areas R1-R4 corresponding to the entirety of the image to be formed are formed on the photosensitive layer 22*b* of the photosensitive film 22. After all of the exposure areas R1-R4 are formed, the photosensitive film 22 is subjected to the developing process in the same way as the first embodiment.

In the second embodiment again, the thickness T of the substrate 1 is so set as to satisfy the formula (1). Therefore, the same technical advantages as those of the first embodiment are obtained.

Additionally, in the image forming device X2, the exposure step and the movement step are alternately performed repetitively. Therefore, an image which is larger than the size displayable on the organic EL panel 3 (four times the size of the panel 3 in the above example) can be formed on the photosensitive film 22.

The image forming devices X1, X2 of the present invention are applicable to a printer device for outputting image data stored in a digital camera or a personal computer, for example. Further, the image forming devices X1, X2 are also applicable to a printer device with a digital camera for outputting an image captured by the digital camera.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

What is claimed is:

1. An image forming device comprising a photosensitive recording medium pack and a display panel for exposing the photosensitive recording medium to light, the recording medium pack comprising:

a photosensitive recording medium; and a case containing the recording medium and having an exposure opening for exposing the recording medium;

the display panel comprising:

a light transmissive substrate including a first surface for facing the photosensitive recording medium, a second surface which is opposite from the first surface, and thickness T defined as spacing distance between the first surface and the second surface;

a plurality of light emitting elements provided on the second surface to be spaced from each other;

wherein the display panel is inserted in the case of the recording medium pack through the exposure opening with the first surface of the light transmissive substrate facing the photosensitive recording medium;

a cover attached to the second surface of the substrate for enclosing the plurality of light emitting elements: and a driver unit mounted on the cover for driving the plurality of light emitting elements:

wherein, when refractive index of the substrate is expressed by n and minimum spacing distance between the plurality of light emitting elements is expressed by S, the thickness T satisfies an inequality:

$$T \leq \frac{S\sqrt{n^2-1}}{2}; \text{ and}$$

wherein the display panel directly faces the photosensitive recording medium without any intervening lens.

2. The image forming device according to claim 1, further comprising a reinforcing member for increasing mechanical strength of the substrate.

3. The image forming device according to claim 1, wherein each of the light emitting elements comprises an organic EL element.

4. The image forming device according to claim 1, wherein the display panel is capable of displaying a pattern corresponding to entirety of an image to be formed on the photosensitive recording medium.

5. The image forming device according to claim 1, further comprising a mover for moving the substrate of the display panel relative to the photosensitive recording medium, wherein the display panel is capable of individually displaying a plurality of patterns corresponding to a plurality of partial images constituting an image to be formed on the photosensitive a recording medium.

* * * * *